(12) United States Patent
Bhar et al.

(10) Patent No.: US 10,037,321 B1
(45) Date of Patent: Jul. 31, 2018

(54) CALCULATING A MATURITY LEVEL OF A TEXT STRING

(71) Applicant: Amazon Technologies, Inc., Seattle, WA (US)

(72) Inventors: Bigyan Bhar, Kolkata (IN); Saurabh Sohoney, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/484,002

(22) Filed: Apr. 10, 2017

Related U.S. Application Data

(62) Division of application No. 14/557,237, filed on Dec. 1, 2014, now Pat. No. 9,672,203.

(51) Int. Cl.
*G06F 17/27* (2006.01)

(52) U.S. Cl.
CPC ........ *G06F 17/2785* (2013.01); *G06F 17/274* (2013.01); *G06F 17/2705* (2013.01)

(58) Field of Classification Search
CPC .... G06F 17/27; G06F 17/274; G06F 17/2775; G06F 17/2785; G06F 17/279
USPC .................. 704/1, 9, 10; 434/178
See application file for complete search history.

(56) References Cited

U.S. PATENT DOCUMENTS

| | | | |
|---|---|---|---|
| 6,492,998 B1 | 12/2002 | Kim et al. | |
| 7,386,439 B1 | 6/2008 | Charnock et al. | |
| 8,744,855 B1 | 6/2014 | Rausch | |
| 8,892,421 B2 | 11/2014 | Sheehan et al. | |
| 9,672,203 B1* | 6/2017 | Bhar | G06F 17/271 |
| 2003/0018663 A1* | 1/2003 | Cornette | G06F 17/21 715/202 |
| 2003/0068603 A1 | 4/2003 | Cupp | |
| 2003/0097636 A1 | 5/2003 | Cleveland | |
| 2005/0039121 A1 | 2/2005 | Cleveland | |
| 2007/0065789 A1* | 3/2007 | Goldman | G09B 7/08 434/236 |
| 2008/0021894 A1* | 1/2008 | Styles | G06F 17/30684 |
| 2009/0024385 A1 | 1/2009 | Hirsch | |
| 2009/0248399 A1 | 10/2009 | Au | |
| 2012/0078612 A1 | 3/2012 | Kandekar et al. | |

(Continued)

OTHER PUBLICATIONS

"Nonlinear narrative", Wikipedia, 7 Pages, downloaded Mar. 27, 2018.*

(Continued)

*Primary Examiner* — Martin Lerner
(74) *Attorney, Agent, or Firm* — Kilpatrick Townsend & Stockton LLP

(57) ABSTRACT

Techniques for determining a maturity level of a text string may be provided. For example, the text string may be associated with an electronic book or story, script or closed captioning of a movie or television show, or other text associated with media. The system may analyze the text string to identify actions in the text (e.g., concepts of death, degree of violence, etc.), story complexity (e.g., number of characters, linear/non-linear story flow, etc.), vocabulary (e.g., unique words, complexity of terms, etc.), and other metrics to determine the objective maturity level associated with the text string. The maturity level and/or references to electronic books associated with the particular maturity level may be provided to users and/or used in additional processing and analysis.

18 Claims, 8 Drawing Sheets

(56) References Cited

U.S. PATENT DOCUMENTS

| | | | |
|---|---|---|---|
| 2012/0158707 A1* | 6/2012 | Story, Jr. | G06F 17/27 707/723 |
| 2013/0144607 A1* | 6/2013 | Weber | G06F 17/21 704/9 |
| 2013/0282628 A1 | 10/2013 | Bengfort et al. | |
| 2013/0309649 A1 | 11/2013 | Tsai et al. | |
| 2013/0311870 A1 | 11/2013 | Worsley et al. | |
| 2014/0115451 A1* | 4/2014 | Sheldon-Dante | G06F 17/248 715/255 |
| 2014/0156554 A1* | 6/2014 | Payne, IV | G06Q 30/0282 705/347 |
| 2014/0163965 A1 | 6/2014 | Barve et al. | |
| 2014/0172418 A1 | 6/2014 | Puppin | |
| 2014/0234810 A1 | 8/2014 | Flor et al. | |
| 2014/0295384 A1 | 10/2014 | Nielson et al. | |
| 2015/0154166 A1* | 6/2015 | Allen | G06F 17/30716 715/230 |
| 2015/0194153 A1 | 7/2015 | Lee et al. | |
| 2016/0063596 A1 | 3/2016 | Landau et al. | |
| 2016/0117311 A1 | 4/2016 | Maetz et al. | |

OTHER PUBLICATIONS

U.S. Appl. No. 14/557,237, filed Dec. 1, 2014, Titled: Calculating a Maturity Level of a Text String.

* cited by examiner

CALCULATING A MATURITY LEVEL OF A TEXT STRING

CROSS-REFERENCE TO RELATED APPLICATIONS

This application is a divisional of and claims priority to U.S. patent application Ser. No. 14/557,237, filed Dec. 1, 2014, now U.S. Pat. No. 9,672,203 issued on Jun. 6, 2017, and entitled "Calculating a Maturity Level of a Text String," which is incorporated herein by reference for all purposes.

BACKGROUND

Web pages provide various options to search for items. For example, a user looking for a book entitled "My Favorite Book" or a movie entitled "My Favorite Movie" may type the title of the book or movie into a search tool provided by the web page and receive a link to the particular book or movie the user requested. However, it may be more difficult to search for content, including the content included with electronic books or movies. For example, some movies are provided with content ratings, but the rating system is subjective, manual, and time-consuming. This process can be especially troublesome when the number of items with content increases too quickly for the subjective rating system to review and rate in an efficient manner.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for determining a maturity level of a text string (e.g., two or more linguistic terms that are placed together). For example, the text string may be associated with content of an electronic book or story, script or closed captioning of a movie or television show, or other text associated with media. The system may analyze the text string to identify linguistic elements and/or actions in the text (e.g., concepts of death, degree of violence, etc.), story complexity (e.g., number of characters, linear/non-linear story flow, etc.), vocabulary (e.g., unique linguistic terms or words, complexity of terms, etc.), and other metrics to determine the objective maturity level associated with the text string. The maturity level and/or references to electronic books associated with the particular maturity level may be provided to users and/or used in additional processing and analysis.

In an illustrative example, a webpage provides an electronic search engine (e.g., an electronic marketplace, item search tool, etc.) to search for books. A parent uses the web page to search for a book to order for his child in the first grade. When the user attempts to search for a book, the webpage provides several search options for the parent, including a text field (e.g., to provide the title, author, or generic topic of a book) and sort features (e.g., sort by price, etc.). The webpage also provides a search option that allows the parent to filter the search results to books of a certain maturity level (e.g., first grade, six years old, sixth year non-native English speaker, etc.). This can help the parent ensure that the ordered book is directed to an appropriate story complexity for the child.

Figure 1:
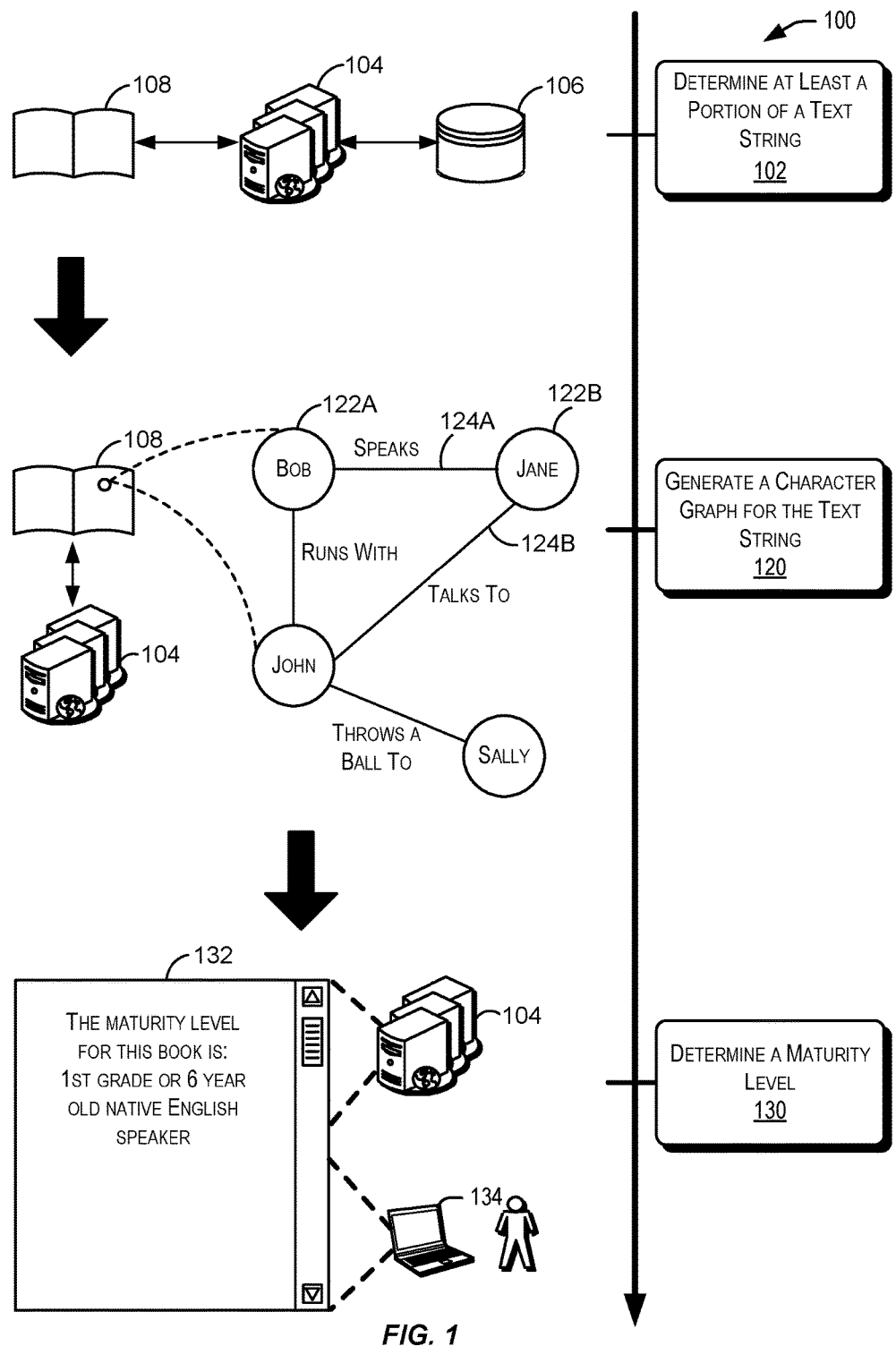
FIG. 1 illustrates an illustrative flow for determining a maturity level of a text string described herein, according to at least one example.

FIG. 1 illustrates an illustrative flow for determining a maturity level of a text string described herein, according to at least one example. The process 100 can begin with determining at least a portion of a text string at 102. For example, a computer system 104 can interact with a data store 106 to access information and/or interact with an electronic book 108 to determine the information. For example, the electronic book 108 may contain a text string and the computer system 104 may store that text string in the data store 106. Other types of information may be stored with the data store 106 without diverting from the scope of the disclosure.

The process 100 may also generate a character graph for the text string at 120. For example, the computer system 104 can interact with data store 106 and/or electronic book 108 to identify nouns or pronouns (e.g., reference to a specific object, including character names "Bob" or "Sally" or replacements for the names "him" or "them") and/or verbs (e.g., the action, occurrence, or state of being) in the electronic text through various techniques, including natural language processing (NLP). As illustrated, the noun or pronoun may include character names. For example, a first noun 122A may refer to the character "Bob" and a second noun 122B may refer to the character "Jane." Other characters may be referenced as well, including characters John and Sally (hereinafter "nouns 122").

One or more verbs may be included with the character graph as well. For example, a first verb 124A may refer to the action "speaks" and a second verb 124B may refer to the action "talks" (e.g., verb) or "talks to" (e.g., verb and preposition). Other verbs/actions may be referenced as well, including actions "runs with" and "throws a ball to" (hereinafter "verbs 124"). In an example illustration, the text string may include one or more nouns, pronouns, and verbs: "John talks to Sally. He speaks with her." It should be appreciated that evaluating a text string may involve reviewing not only nouns, pronouns, and verbs but also additional terms (e.g., adjectives, adverbs, conjunctions, etc.) without diverting from the scope of the disclosure.

In some examples, the character graph may comprise one or more linguistic elements. For example, the computer system 104 can interact with data store 106 and/or electronic book 108 to identify the one or more linguistic elements. Linguistic elements may include, for example, nouns, verbs, prepositions, pronouns, adverbs, adjectives, simple present, simple past, past/present participle, infinitive, title, auxiliary verbs, direct/indirect objects, subject complements, gerund, or other examples of linguistic elements. The linguistic element may also include parts of one or more terms (e.g., Greek or Latin root words, "ling" or "lang," ending of a word, etc.), less than an entire word, origin language elements, or conjugations of the terms (e.g., active/passive, "-ing," "-ed," etc.).

The process 100 may also determine a maturity level at 130. For example, the computer system 104 can determine the maturity level from the character graph, electronic book, and/or other analysis of the text string (e.g., without generating a character graph). The analysis may include identifying actions in the text, story complexity, vocabulary, and other metrics to determine the objective maturity level associated with the text string. In some examples, the computer system 104 can provide a communication through a network page 132 or other application (e.g., as defined in FIG. 2) to the user computing device 134 regarding the maturity level.

Figure 2:
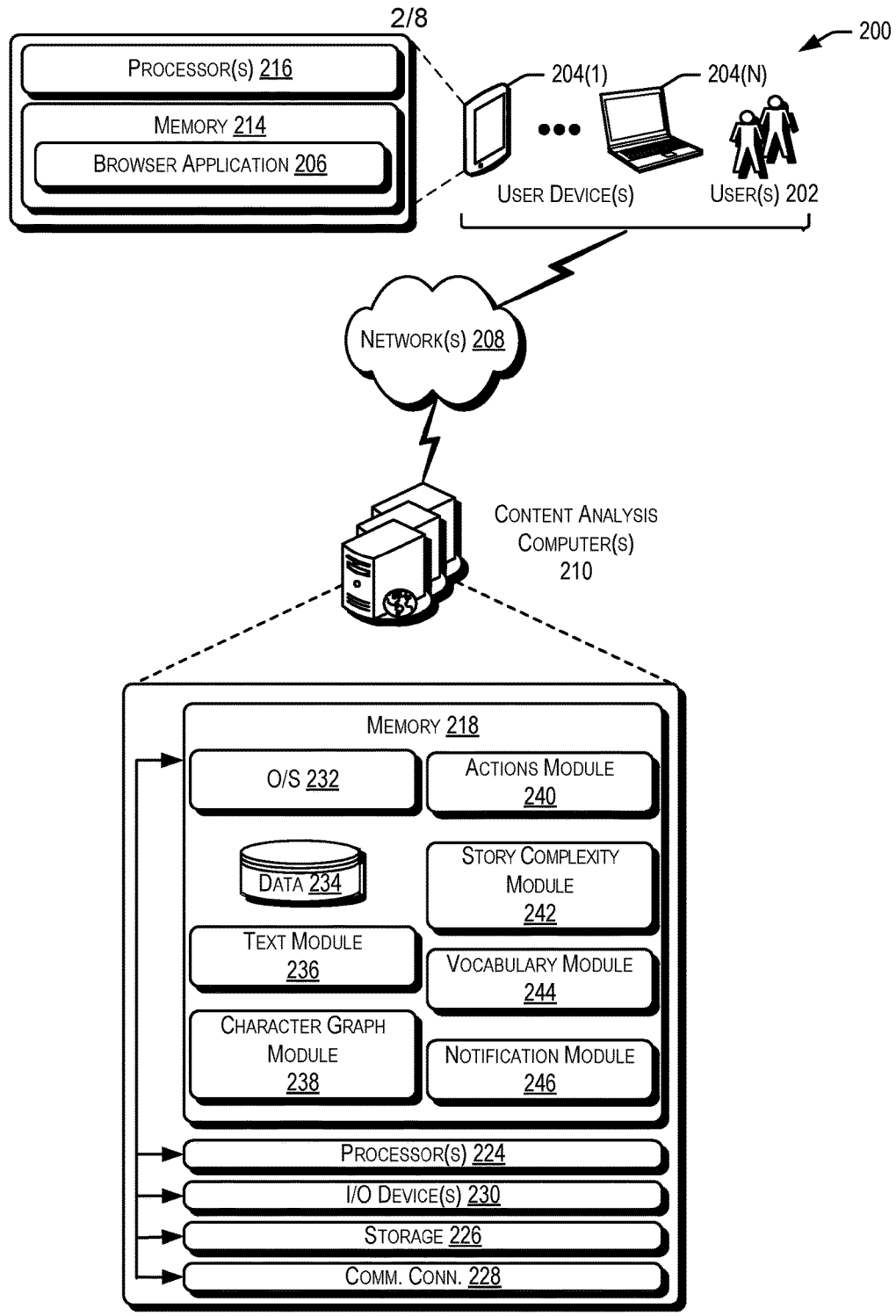
FIG. 2 illustrates an example architecture for determining a maturity level of a text string described herein that includes a content analysis computer and/or a user device connected via one or more networks, according to at least one example.

FIG. 2 illustrates an example architecture for determining a maturity level of a text string described herein that includes a content analysis computer and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more content analysis computers 210. The one or more content analysis computers 210 may, in some examples, provide computing resources such as, but not limited to, client entities, low latency data storage, durable data storage, data access, management, virtualization, cloud-based software solutions, electronic content performance management, etc. The one or more content analysis computers 210 may also be operable to provide web hosting, computer application development, and/or implementation platforms, combinations of the foregoing, or the like to the one or more users 202. The one or more content analysis computers 210, in some examples, may help determine a maturity level of a text string and/or provide a reference to a text string (e.g., as a recommendation for an electronic book, movie, etc.) to one or more user devices 204.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the content analysis computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more content analysis computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the content analysis computers 210 via the networks 208, or via other network connections. Additionally, the user devices 204 may be part of the distributed system managed by, controlled by, or otherwise part of the content analysis computers 210 (e.g., a console device integrated with the content analysis computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the content analysis computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the content analysis computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the content analysis computers 210 may be in communication with the user devices 204 and/or other service providers via the networks 208, or via other network connections. The content analysis computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the content analysis computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of content analysis computers 210, the memory 218 may be volatile (such as RAM) and/or non-volatile (such as ROM, flash memory, etc.). The content analysis computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the content analysis computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the content analysis computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The content analysis computers 210 may also contain communications connection(s) 228 that allow the content analysis computers 210 to communicate with a stored database, another computing device or server, user terminals and/or other devices on the networks 208. The content analysis computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including a text module 236, a character graph module 238, an actions module 240, story complexity module 242, vocabulary module 244, and/or a notification module 246. The modules may be software modules, hardware modules, or a combination thereof. If the modules are software modules, the modules will be embodied on a computer readable medium and processed by a processor in any of computer systems described herein. In some examples, the text module 236 may be configured to determine at least a portion of a text and/or text string, correlate an electronic book, movie, or other media with the text string, determine one or more linguistic elements (e.g., verbs, nouns, or pronouns, etc.) with the text string, calculate a number of actions and/or characters in a text string, analyze a text string using natural language processing (NLP), and determine a scene in an electronic book.

The character graph module 238 may be configured to generate a character graph and/or analyze the character graph to help determine a maturity level of a text string. In some examples, the character graph module 238 may not generate a character graph, but may analyze the text string to determine the maturity level for the text string in other ways (e.g., through the use of a dictionary or data store of mature vocabulary, by calculating a number of occurrences of a noun, verbs, or other linguistic elements, etc.).

The actions module 240 may be configured to determine one or more actions associated with a text string (e.g., via the text module 236). For example, the actions may be identified from the text string, a character graph (e.g., via the character graph module 238), a data store, or other sources. The actions module 240 may also be configured to help determine a maturity level for a text string, such that when violence and concepts of death are present in the text string, the maturity level is greater than when these actions are not in the text string.

The story complexity module 242 may be configured to determine one or more concepts associated with a text string, including a story line, scene, and linear or non-linear story flow. The story complexity module 242 may also be configured to help determine a maturity level associated with the number of characters (e.g., via the text module 236 and/or character graph module 238), such that a greater number of characters may also increase the maturity level of the text string.

The vocabulary module 244 may be configured to determine one or more unique linguistic terms or words in a text string, compare linguistic elements (e.g., via the text module 236) with a dictionary or data store of mature vocabulary, and help identify a maturity level based in part on the linguistic elements used in the text string (e.g., more complex words may correlate to a greater maturity level than simple words, etc.). In some examples, the vocabulary module 244 may generate the dictionary (e.g., by comparing linguistic elements from other text strings with known associations to a maturity level, by adding linguistic elements from other text strings to the dictionary, and/or by incorporating other dictionaries with the dictionary used with the system, etc.).

The notification module 246 may be configured to send or receive one or more communications from the user, including communications regarding the maturity level for an electronic book or text, search results in response to a request for a recommendation for a text string with a certain maturity level, or other information.

Figure 3:
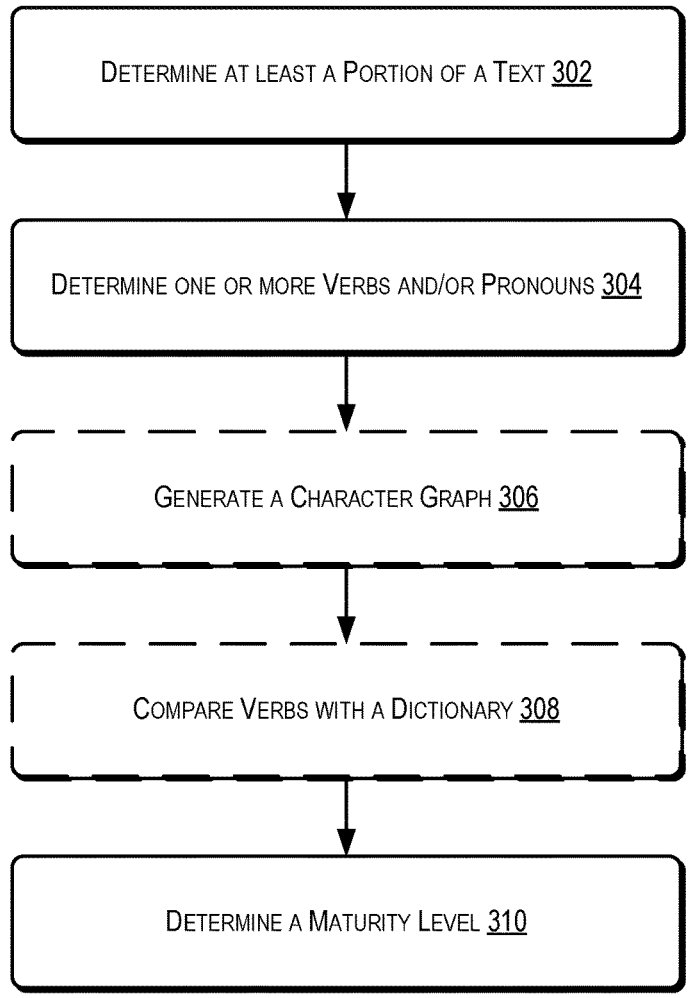
FIG. 3 illustrates an example flow diagram for determining a maturity level of a text string described herein, according to at least one example.

FIG. 3 illustrates an example flow diagram for determining a maturity level of a text string described herein, according to at least one example. In some examples, the one or more content analysis computers 210 (e.g., utilizing at least one of the text module 236, the character graph module 238, the actions module 240, the story complexity module 242, the vocabulary module 244, and/or the notification module 246) or one or more user devices 204 shown in FIG. 2 may perform the process 300 of FIG. 3. The process 300 may begin at 302 by determining at least a portion of a text string. For example, the content analysis computers 210 may determine, receive, analyze, reference, or otherwise access a text string. The text string may be associated with an electronic book or other media (e.g., the entire electronic book or some portion of the electronic book, etc.).

At 304, one or more linguistic elements (e.g., verbs, nouns, pronouns, etc.) may be determined. For example, the content analysis computers 210 may parse the text string to determine the one or more verbs, nouns, and/or pronouns in the text string. In some examples, the content analysis computers 210 may analyze the text string using natural language processing to determine the one or more verbs/actions, nouns/characters, etc. in the text string. The nouns may be associated with one or more characters in the text string and the verbs may be associated with actions of those characters.

At 306, a character graph may optionally be generated. For example, the content analysis computers 210 may generate the character graph that associates the one or more verbs with the one or more nouns. The character graph may associate the one or more verbs with the one or more nouns identified as character in the electronic book.

At 308, linguistic elements (e.g., verbs) may optionally be compared with a dictionary. For example, the content analysis computers 210 may compare the one or more verbs in the text string with one or more verbs included in a dictionary. The dictionary may include maturity levels that associate one or more verbs (e.g., each of the verbs, some of the verbs, etc.) with a corresponding maturity level. In some examples, the dictionary may be implemented as a data store of mature vocabulary, so that the verbs in the data store (e.g., dictionary) identify verbs associated with greater maturity levels.

At 310, a maturity level may be determined. For example, the maturity level may be based in part on the comparison of one or more verbs with the dictionary (e.g., using the maturity level identified by the dictionary, averaging the maturity level of the identified verbs, choosing the greatest maturity level associated with the verbs in the dictionary, etc.). In some examples, the content analysis computers 210 may determine a maturity level based in part on the character graph (e.g., the complexity of the character graph, the size of the character graph, etc.).

Figure 4:
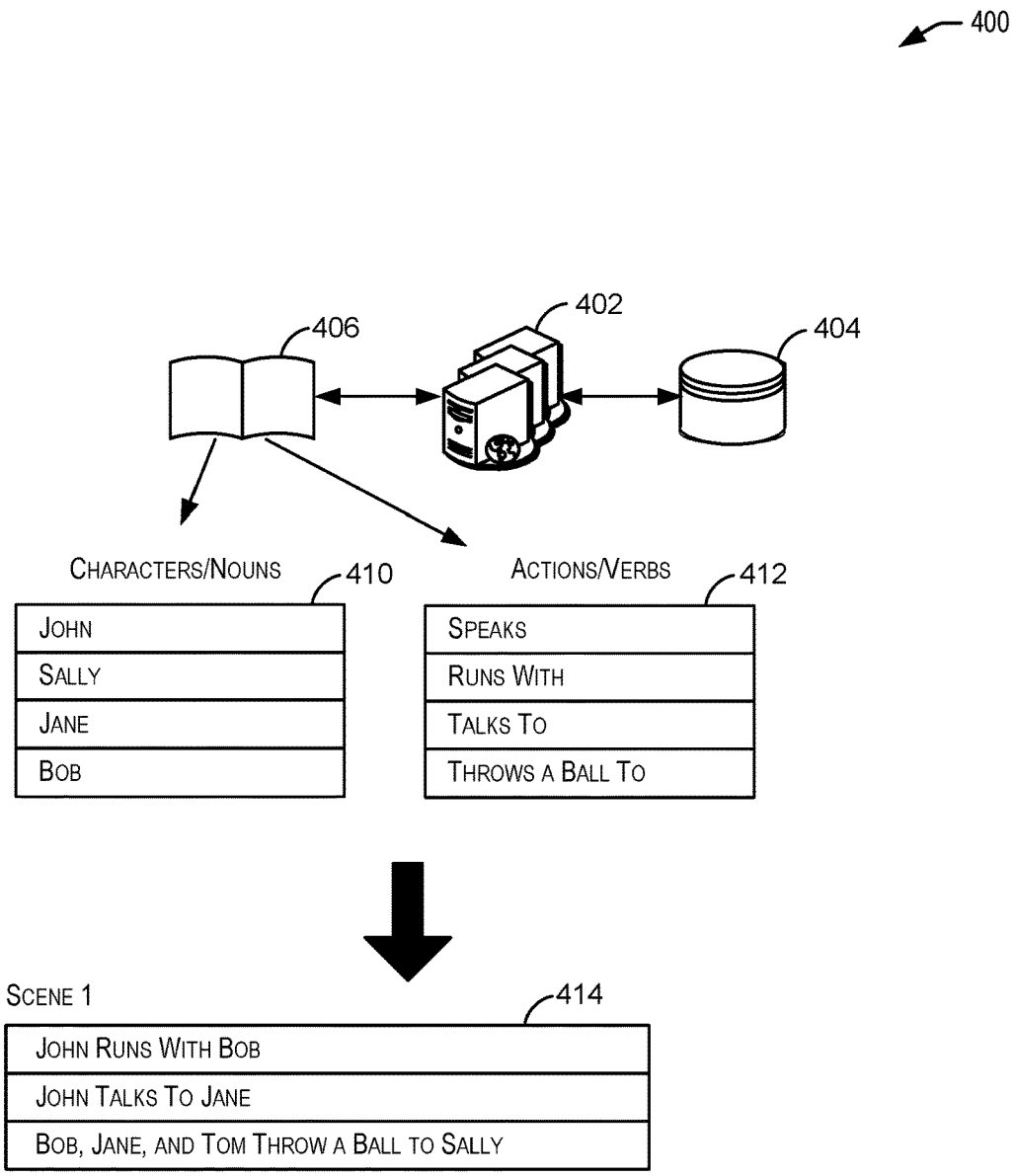
FIG. 4 illustrates some examples of determining a maturity level of a text string described herein, according to at least one example.

FIG. 4 illustrates some examples of determining a maturity level of a text string described herein, according to at least one example. In illustration 400, a computing device 402 interacts with a data store 404 and/or a text string associated with an electronic book 406. Examples of the computing device 402 and data store 404 are illustrated in FIG. 2 as the content analysis computers 210 and data store 234, respectively.

The electronic book 406 may include a title, author, chapter(s), scene(s), and other aspects of a book. These portions of the book may be partitioned into a text string. For example, the text string may comprise the entire book, title of the book, one or more chapters of the book, one or more scenes (e.g., of a play, script, subtitles, electronic text, etc.), or any other collection of terms that are associated with the electronic book (e.g., epilogue, prologue, forward, preface, summary, brief description, footnotes, etc.). In another example, the computing device 402 may analyze a single chapter of the electronic book as the text string (e.g., in order to extrapolate the overall maturity level of the book from that one chapter). In some examples, the computing device 402 may analyze a number of terms or linguistic elements within a threshold distance of each other (e.g., include the 100 terms before and 100 terms after the word "conversation," etc.) or a threshold number of terms or linguistic elements as the text string (e.g., about 1,000 words in the middle of the text, etc.).

In some examples, the electronic book 406 may correspond with a format other than a book. For example, the electronic book 406 may be a spoken story. The electronic book 406 may be a motion picture and the text string may be associated with a script or subtitles of the motion picture. In another example, the story may be associated with an electronic book and the text string may be a passage or chapter of the electronic book. Other stories and/or texts may be implemented as an electronic book as well.

The computing device 402 may analyze the text string using Natural Language Processing (NLP) (e.g., language as spoken or written by humans, etc.). For example, a text string can be processed to identify different linguistic elements, characters (e.g., nouns, pronouns, etc.), actions (e.g., verbs, etc.), and relationships among the characters being described. One or more NLP methods may be implemented. For example, the computing device 402 may identify a part of speech (e.g., to determine nouns, verbs, adjectives, etc.). In another example, the computing device 402 may implement phrase detection or chunking of portions of the text string. Phrase detection or chunking may determine useful or connected sub-parts of a text string. For example, the text string "I went to college to submit my thesis today" may include "I went to college" and "to submit my thesis" as separate chunks of the text string. In some examples, the NLP may identify one or more linguistic elements.

In some examples, the computing device 402 may also or alternatively implement dependency parsing to help to determine relationships between different characters of the sentence. For example, the text string may include "John played basketball with Bob." The relationship between John-Basketball and John-Bob may be determined through a parse tree or graph generated using dependency parsing. Once the parse tree or graph is created using these techniques, the parse tree or graph can be pruned to remove noise (e.g., unnecessary parts when analyzing the natural language of the text string). For example, when a character is mentioned once or twice in a story, the character may be pruned or ignored. In another example, when the character performs few actions (e.g., associated with a few number of verbs or other linguistic elements), the character may be pruned or ignored. In some examples, the pruning may help highlighting prominent subsets of characters, reduce the overall complexity of the graph, and/or improve accuracy of the NLP.

Nouns, pronouns, and characters 410 may be determined from the electronic book 406. For example, the computing device 402 may identify the characters 410 by comparing known character names in a dictionary with a term identified in the text string. In another example, the capitalization or case of the term may be identified as a character by the computing device 402 (e.g., "Yesterday, May walked down the street" versus "I may walk down the street"). In another example, the sentence structure may be analyzed to determine the character (e.g., in relation to linguistic elements including a verb or adjective, etc.). As illustrated, the characters 410 may include "John," "Sally," "Jane," and "Bob" for a particular electronic book 406.

Verbs, prepositions with verbs, and/or actions 412 may be determined from the text as well. For example, the computing device 402 may identify the actions 412 by comparing known actions in a dictionary with a term identified in the text string. In another example, the conjugation of the term in one or more parts of the text string may be identified as a verb by the computing device 402 (e.g., "John walks down the street" versus "John walked down the street" versus "John is walking down the street" to identify "walk" as a verb). In another example, the sentence structure may be analyzed to determine the action (e.g., in relation to a noun or pronoun, etc.). As illustrated, the actions 412 may include "speaks," "runs with," "talks to," and "throws a ball to" for a particular electronic book 406 and/or text string associated with the electronic book 406.

Scenes 414 may be determined from a text string as well. For example, the computing device 402 may identify a scene between two headings (e.g., "chapter one" and "chapter two") or a delineation of a scene in a script (e.g., that mentions the term "scene" or other identifier). In some examples, the scene corresponds with a paragraph or other threshold number of terms (e.g., a minimum number of 100 terms, a minimum of ten actions, etc.). As illustrated, the scene may include one or more sentences, including "John runs with Bob," "John talks to Jane," and "Bob, Jane, and Tom throw a ball to Sally."

In some examples, a scene may be determined by calculating a number of nouns associated with the scene and comparing the number of nouns with a character threshold. The character threshold may be associated with one or more maturity levels. For example, a character threshold for a first grade maturity level may be two characters while a character threshold for a third grade book may be four characters. In some examples, the greater number of nouns corresponds with a greater maturity level. In other examples, a single character threshold may be used, such that when the number of characters exceeds four, the maturity level is that of at least a seven year old, native English speaker. The character threshold and the number of nouns associated with the scene may be compared in order to determine the maturity level of the electronic book.

In some examples, an importance of a character may be identified as well. For example, the computing device 402 may implement natural language processing (NLP) and/or dependency parsing to create a graph. The characters that remain in the draft may be considered an "important" character. In another example, the characters that are mentioned less frequently (e.g., below a threshold) may be pruned from the graph. In some examples, the characters that are mentioned above a threshold number (e.g., 10, 100, etc.) of times may be considered an "important" character.

Figure 5:
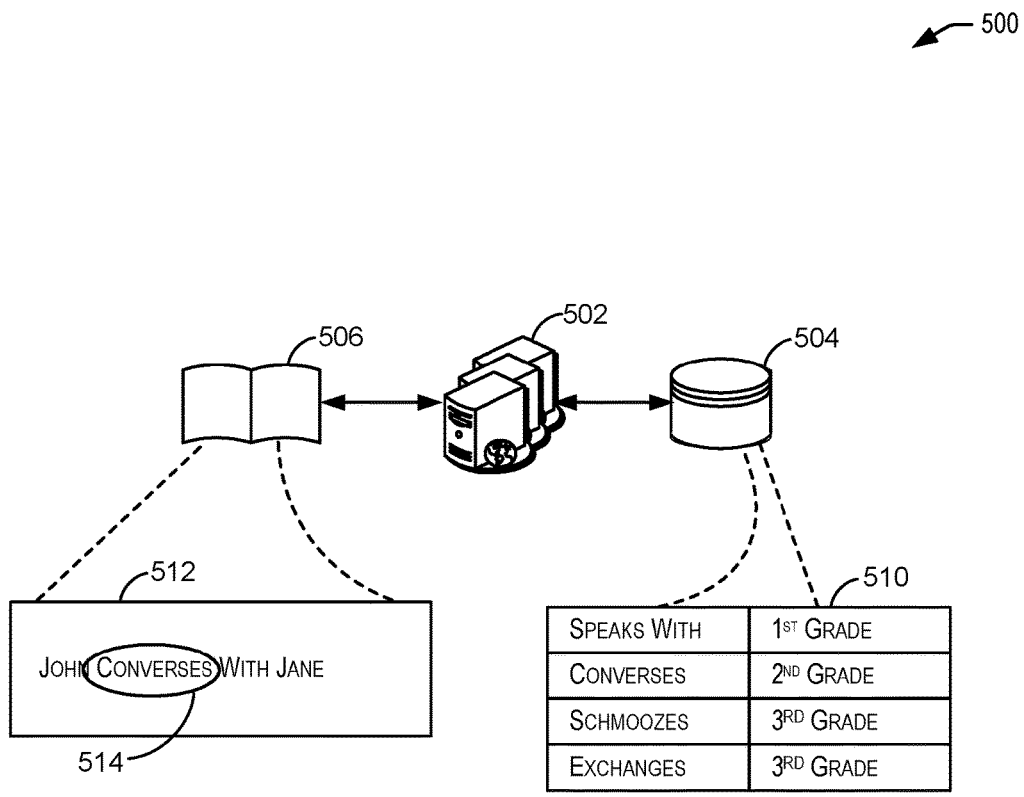
FIG. 5 illustrates some examples of determining a maturity level of a text string described herein, according to at least one example.

FIG. 5 illustrates some examples of determining a maturity level of a text string described herein, according to at least one example. In illustration 500, a computing device 502 interacts with a data store 504 and/or a text string associated with an electronic book 506. Examples of the computing device 502 and data store 504 are illustrated in FIG. 2 as the content analysis computers 210 and data store 234, respectively.

The electronic book may be compared with a dictionary 510. The dictionary may include one or more linguistic elements and/or actions (e.g., verbs, verbs with prepositions, etc.) and a corresponding maturity level. The computing device 502 may determine the maturity level of the book based in part on the comparison of the one or more verbs with the maturity level of the one or more verbs in the dictionary of verbs. The dictionary may include other actions, verbs, or terms with an associated maturity level for that term. As illustrated, the action "speaks with" corresponds with the maturity level "first grade," the action "converses" corresponds with the maturity level "second grade," the action "schmoozes" corresponds with the maturity level "third grade," and the action "exchanges" (e.g., in terms of speech) corresponds with the maturity level "third grade."

The action may be identified in the text string. For example, after determining the text string 512 in the electronic book 506, the computing device 502 may parse the text string to identify one or more actions in the text string. As illustrated, the action 514 "converses" is identified in the text string. The computing device 502 may compare the action 514 with the previously identified actions in the dictionary 510 to determine whether the action appears in the dictionary and/or determine additional information about the action from the dictionary.

Some types of information that may be determined from the dictionary is a maturity level. In some examples, when a term appears in the text string, the computing device 502 may identify or otherwise parse that term, compare it with the dictionary, and if the term is included with the dictionary, associate at least a portion of the text string with that particular maturity level. The maturity level of the text string may be based in part on a comparison of one or more verbs with a dictionary of verbs. As illustrated, the action "converses" is identified in the dictionary 510 as associated with a maturity level of "second grade."

As another example illustration, a maturity level of a text string may include "6 year-old English speaker" (e.g., first grade). The verbs associated with this text may include relatively simple verbs, including "talk," "speak," "run," "play," "throw," "eat," "go," "send," and the like. Comparatively, a maturity level of a text may include "8 year-old English speaker" (e.g., third grade). The verbs associated with this text may include more complex verbs, including "traverse," "schmooze," "exchange," and the like. In some examples, the maturity level is associated with a number of years of speaking English (e.g., language proficiency) instead of a maturity or age of the user, which may be relevant for non-native English speakers.

In some examples, the dictionary may identify a topic of the linguistic element (e.g., verb). For example, the actions "speaks with," "converses," "schmoozes," and "exchanges" may all correlate with speech or communication. The various forms of communication may correspond with different maturity levels, based in part on the difficulty of pronouncing or spelling the word, or other objective measurements associated with a term's complexity. The computing device 502 may adjust the maturity level of the electronic book to a greater maturity level based in part on the association of the one or more verbs when the difficulty of pronouncing or spelling the verb similarly increases. In some examples, the computing device 502 may adjust the maturity level of the electronic book to a greater maturity level based in part on the number of unique linguistic terms in the text string exceeding a threshold.

Another topic of a linguistic element (e.g., verb) is violence and/or death, which may also affect the maturity level of the text string. For example, the computing device 502 may determine that one or more verbs are associated with violence (e.g., by comparing them to a dictionary, by identifying a synonym of the verb that is associated with violence, etc.). The computing device 502 may adjust the maturity level of the electronic book to a greater maturity level based in part on the association of the one or more verbs with violence.

The dictionary may be generated using various methods. For example, the computing device 502 may receive a different electronic book that includes one or more actions/verbs and a particular maturity level (e.g., for the entire book, for the particular verb, etc.). The computing device 502 may identify verbs in the different electronic book and update the dictionary to include the verbs. In some examples, the dictionary includes a link or reference to the different electronic book without copying the verb.

In some examples, the different electronic book is associated with a particular maturity level. When the one or more linguistic elements are identified in the different electronic book, the maturity level associated with the different electronic book may also be associated with the linguistic elements. In some examples, only some of the linguistic elements are associated with the overall maturity level of the book. After the maturity level and/or linguistic elements are identified, the dictionary may be updated to include at least one linguistic element associated with the particular maturity level (e.g., from the different electronic book).

The dictionary may be generated using terms from other sources. For example, the computing device 502 may update the dictionary with one or more linguistic elements and a user may associate the maturity level of those linguistic elements in the dictionary. In some examples, the computing device 502 may analyze an electronic book associated with a known maturity level and associate one or more verbs or nouns (or other linguistic elements) in that electronic book as verbs or nouns to recognize in other electronic books. As an illustration, a first grade reading list of electronic books may be identified as corresponding with a first grade maturity level. The computing device 502 may parse the electronic books listed in the reading list, receive a text string associated with each of the electronic books, determine the nouns/verbs associated with the text string(s), and update the dictionary to include those verbs/nouns and the first grade maturity level.

In some examples, a source of words and synonyms is analyzed to generate or supplement the dictionary. For example, a lexical data store that includes various linguistic elements, including nouns, verbs, adjectives, or adverbs that are grouped into sets of cognitive synonyms or concepts may be used. In other examples, a tool providing computational linguistics or natural language processing (NLP) may also be used to help generate the dictionary.

The dictionary may be generated based in part on actions of a user. For example, one or more users may be associated with a particular maturity level. The verbs and other linguistic elements that the user uses while sending communications (e.g., text or SMS messages, emails, etc.), searching for items (e.g., through a search tool on a web page or electronic marketplace), reading other electronic books (e.g., the user searches and/or reads a news article or a public book), or other sources may be associated with the user's maturity level. In some examples, the user may be associated with a maturity level through a profile, browsing history, or other source of information that can determine the user's reading, maturity level, proficiency of the English language, or age.

The more advanced maturity level may also be included with more complex concepts, including violence (e.g., "shoot" or "killed") and affection/marriage (e.g., "kissed"). In an example illustration, a character "John" in a story may shoot two other characters in the story, "Jim" and "Jane." The term "shoot" may be associated with an advanced maturity level (e.g., fourth grade), so that whenever this action appears in the text string, the maturity level of the text starts at a minimum of fourth grade. In this illustration, the term appears at least twice (e.g., for each Jim and Jane), causing the overall maturity level of the text string to equal at least a fourth grade maturity level. The frequency of using the action "shoot" (or its equivalents) in the text string may increase the maturity level of the text string to fifth grade. In some examples, the term (or synonyms of the term) may be associated with a data store for mature vocabulary.

In some examples, the complexity of the linguistic element may correspond with a maturity level of the user instead of an age. For example, the term "shoot" may correspond with a second year English speaker and the terms "annihilate," "catapult," or "vaporize" may correspond with a fourth year English speaker, even though the terms may be synonyms or associated with similar concepts. In some examples, one or more of these linguistic elements may also be associated with a data store for mature vocabulary.

In some examples, a violence rating may be determined for the linguistic element. The violence rating may correspond with a particular character or other linguistic element in a portion of the text string. For example, the term "shoot" may correspond with a relatively low violence rating (e.g., 3 out of 10) whereas "disfigure" or "maim" may correspond with a higher violence rating (e.g., 7 out of 10). When the linguistic element associated with the higher violence rating is associated with the character and/or text string, the maturity level of the character and/or text string may also be greater. The computing device 502 may determine that a particular character is violent based in part the association of the character with violent verbs, concepts, or a greater violence rating.

A hierarchy of linguistic elements may be considered. For example, a base level of the verb "shoot" may correspond with a minimum maturity level for the concept of violence, including a second grade maturity level. The term "annihilate" may be associated with a greater maturity level, based in part on the violent concept of the verb and also the complexity of the verb. The maturity level of the more complex verb associated with the mature concept may be a third or fourth grade maturity level, or the like.

In some examples, the maturity level may be associated with a particular concept in the text string. Using the concept of "death" as an example illustration, the concept of death may be expressed in the text without using terms directly related to death, including "John is met by the Grim Reaper" and "John stops moving and Jane cries." The computing device 502 may determine the concept of death discussed in the text string and correlate the text string with a particular maturity level for that concept, even though the terms "death," "die," or "kill" are not included with the text string. The computing device 502 may identify the concept of death and adjust the maturity level corresponding to the more mature concept (e.g., changing the maturity level from first grade to third grade) and/or mature vocabulary.

In some examples, the maturity level of the text string may be based in part on a tense of one or more verbs for a particular character. For examples, the computing device 502 may determine a tense of one or more verbs for a particular character in the electronic book (e.g., describing a character in the present tense while the character is still alive in the story). The computing device 502 may also determine that the tense of the one or more verbs changes from present tense to past tense for the particular character (e.g., describing the character as deceased and referring to the characters actions in the past when the character was still alive). The maturity level may be adjusted to a greater maturity level based in part on the change in tense.

In some examples, actions may be determined based upon other factors in the text, such as the tense of the verbs or the determination that a character is no longer referenced. In an example illustration, the beginning of the text string may correlate character John with present tense verbs and the middle to the end of the text string may correlate character John with past tense verbs (e.g., to identify the death of character John). In other examples, reference to character John may not correspond with a flow of the story and/or text string, as identified by the computing device 502. In other examples, character John may not be present in the story after a particular point, which can identify that character John may have been killed, thus associating the text with a greater maturity level.

Figure 6:
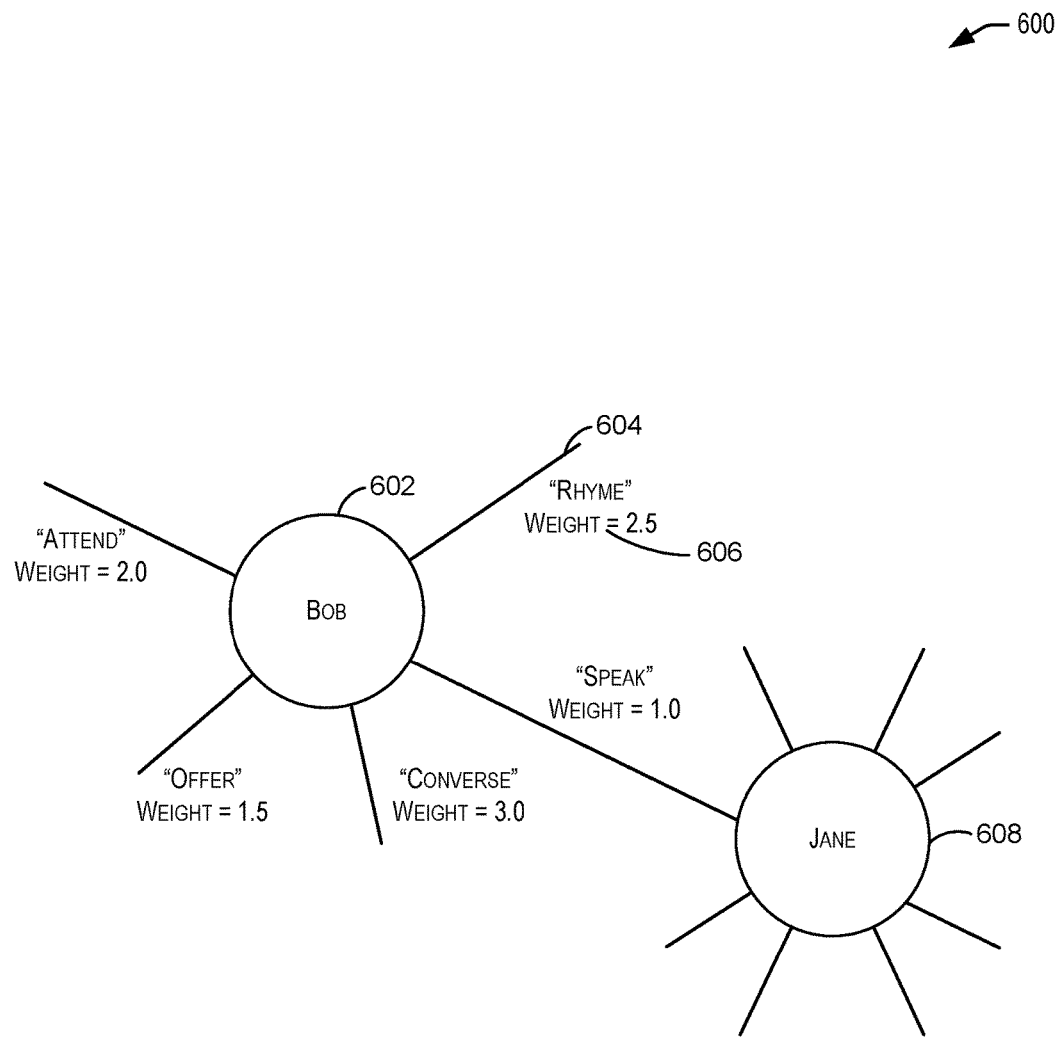
FIG. 6 illustrates some examples of determining a maturity level of a text string described herein, according to at least one example.

FIG. 6 illustrates some examples of determining a maturity level of a text string described herein, according to at least one example. For example, for an electronic book, the content analysis computers 210 may generate a character graph 600 associated with at least a portion of a text string in the electronic book. The character graph comprise one or more linguistic elements, including one or more characters in the text string represented as nodes of the character graph and one or more verbs in the text string represented as edges of the character graph based at least in part on the one or more verbs being associated with the one or more characters in the text string. In some examples, one or more linguistic elements from the text string may be represented as a node or edge of the character graph.

In character graph 600, a noun 602 may be determined in a text string and included with the character graph. In a node and edge format, the verbs 604 or actions associated with the noun may branch off of the noun. As illustrated, Bob is a noun represented as a node and the actions performed by or associated with Bob are identified as edges or lines from the node corresponding with character "Bob." In the text string, Bob may "rhyme," "attend," "offer," "speak," and "converse." Other formats of a character graph may be implemented without diverting from the scope of the disclosure.

In some examples, the one or more verbs in the character graph are associated with one or more weights 606. For example, the one or more weights may be associated with a complexity of the corresponding verbs. The more complex verbs (e.g., associated with a greater maturity level) may affect the overall maturity level more than a relatively simple verb. For example, the verb "speaks" may be associated with a lesser weight in comparison to a more complex verb like "converses" with a greater weight. When "converses" appears in the text string, the weight of the complex term may affect the overall maturity level (e.g., increasing the overall maturity level to the level associated with "converses" instead of the maturity level associated with "speaks"). In some examples, the content analysis computers 210 or other computing device may determine the maturity level of the electronic book based in part on the weights associated with the one or more verbs.

The weights 606 of the character graph may identify other metrics as well. For example, the weights may be affected by the frequency of the verb and/or concept associated with the verb in the story. For example, when the term "shoot" appears in the text string frequently (or other terms associated with violence), the maturity level of the text may be greater than a text string with a relatively infrequent use of violent terms and/or no violent terms. In some examples, the use of the violent term may correspond with a greater weight, thus having a greater effect on the overall maturity level.

Verbs may be combined as well, and identified through the use of the weights 606. For example, when two characters speak to each other frequently, the edges of the character graph may be combined and associated with a greater weight than two characters that infrequently speak to each other. The edges of the character graph, in some examples, may be unique and weights may identify the verbs with higher importance or effect on the maturity level of the text string. In other examples, weights may correspond with a particular verb and the frequency of the use of the verb in the text string.

In some examples, the noun 602 may be associated with other nouns 608 and/or verbs 604. As illustrated, character Bob speaks with character Jane in the text string, so characters Bob and Jane are nodes in the character graph with a connection (e.g., edge, line, etc.) between the two nodes showing their interaction. The character (e.g., Bob) may interact with other characters (e.g., John, Jim) as well. The number of other characters that interact with Bob may be determined as well (e.g., in order to determine a greater story complexity).

The composition of the character graph may affect the maturity level. In some examples, the composition of the character graph may include the number of nodes and/or edges in the character graph. For example, a character graph with three nodes and one-hundred edges may be associated with a more complex story and/or text string than a character graph with two nodes and twenty edges.

In some examples, the composition of the character graph may be compared with one or more thresholds to determine the maturity level. For example, the number of nodes may be compared with a character threshold and/or the number of edges may be compared with an action threshold to identify the maturity level (e.g., to identify the complexity). As an illustration, a first grade maturity level may include a minimum threshold of two nodes and/or twenty edges, so that when the text exceeds one or both thresholds, the text string is associated with a minimum first grade maturity level. A second grade maturity level may be associated with a minimum character threshold of four nodes and/or fifty edges. A fourth grade maturity level may be associated with a minimum character threshold of fifteen nodes and/or seventy-five edges, and the like. If the text fails to exceed a character threshold, action threshold, or both thresholds, the text string may remain at a lower maturity level (e.g., first grade).

The complexity of the character graph may affect the overall maturity level. For example, the content analysis computers 210 may determine that the complexity of the character graph increases when a number of nodes or edges of the character graph increase. In another example, the content analysis computers 210 may determine that the complexity of the character graph increases when one or more verbs associated with violence or death increases.

The overall maturity level of the text string may be determined based in part on one or more of the character graph, vocabulary, the comparison of the one or more linguistic elements with the dictionary, the complexity of the character graph represented as nodes and edges, or other analysis discussed herein. These sources of the analysis may be weighted. For example, a character graph showing story a high complexity (e.g., a large number of characters in comparison to a character threshold) and violent actions may have more weight in the overall maturity level determination than the vocabulary used in the text string. An overall maturity level of the text string may be determined. For example, the content analysis computers 210 may determine the overall maturity level of the text string based at least in part on the comparison of the one or more verbs with the dictionary. The content analysis computers 210 may also and/or alternatively determine the overall maturity level of the text string based at least in part on the complexity of the character graph represented as nodes and edges.

Figure 7:
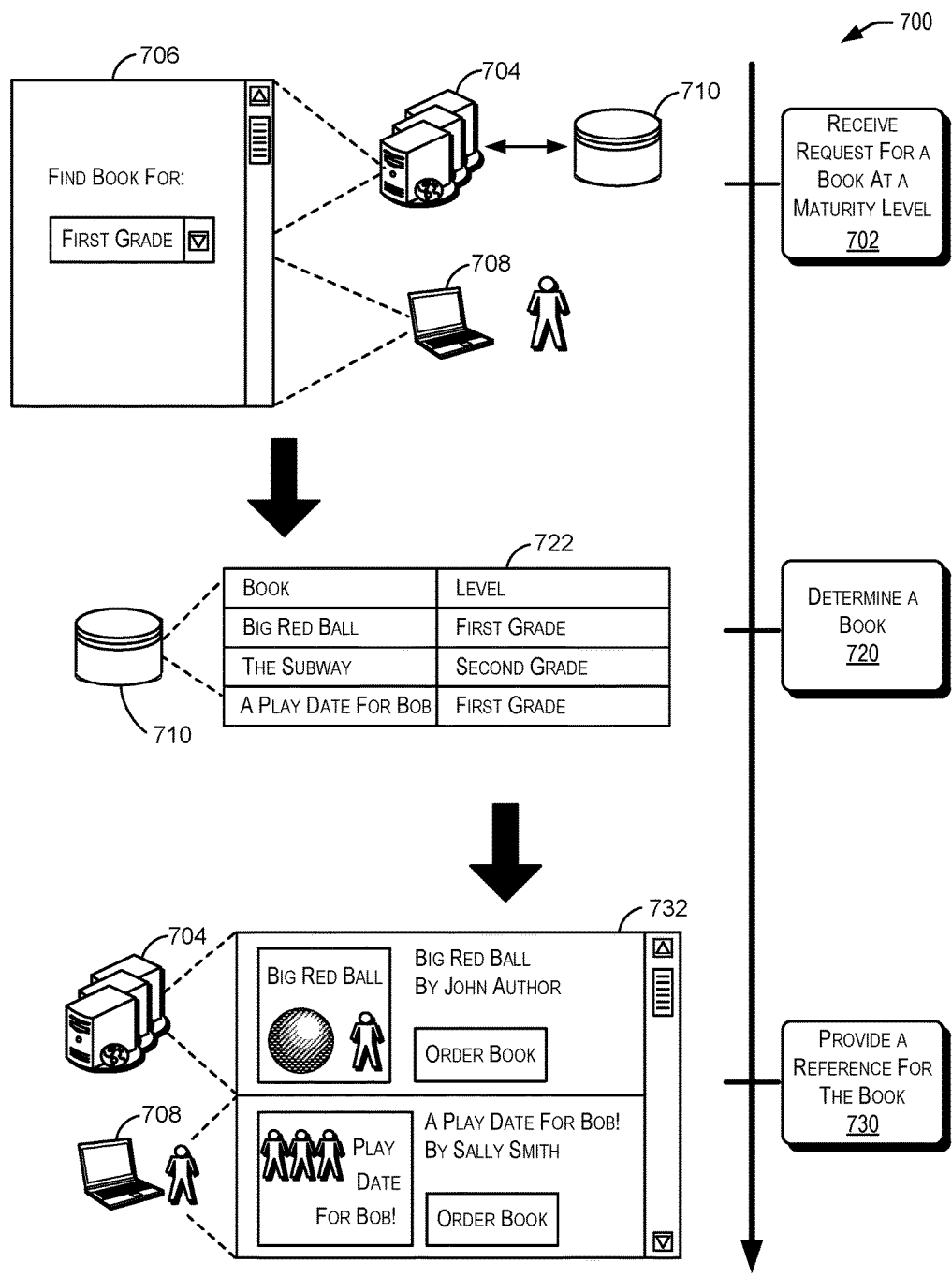
FIG. 7 illustrates an illustrative flow for providing information to a user based in part on the determined maturity level described herein, according to at least one example.

FIG. 7 illustrates an illustrative flow for providing information to a user based in part on the determined maturity level described herein, according to at least one example. The process 700 can begin with receiving a request for a book at a maturity level at 702. For example, the computer system 704 can provide a network page 706 that allows a user 708 to search for an item that contains a text string. The user 708 may type "first grade" into the search tool to look for books associated with a first grade maturity level, select "first grade" from a drop down menu or radio button, or any other method known in the art (e.g., speak to type, check box selection, etc.). The computer system 704 may interact with a data store 710 to access information and about the search terms provided by the user 708. Examples of the computer system 704 and data store 710 are provided throughout the disclosure, including content analysis computers 210 and data store 234 illustrated in FIG. 2.

The process 700 may determine a book at 720. For example, the computer system 704 may identify the maturity level requested by the user as "first grade" and query the data store 710 for any books associated with this maturity level. The maturity levels for various books may be stored in the data store 710 based in part on a previous interaction with an electronic book, as illustrated throughout the specification including in FIG. 1. For example, the requested maturity level (e.g., from the user 708) may be compared with the maturity level associated with the portion of the text string (as discussed in at least FIG. 5). When the requested maturity level is similar to the maturity level associated with the portion of the text string, the computer system 704 can identify the electronic book associated with the story and/or requested maturity level.

Additional information may also be stored in data store 710, including information associated with the text string or electronic book (e.g., title, price, etc.). As illustrated in table 722, the items in the data store 710 include a book titled "Big Red Ball" associated with a first grade maturity level, "The Subway" associated with a second grade maturity level, and "A Play Date for Bob" also associated with a first grade maturity level.

The process 700 may provide a reference for the book at 730. For example, the computer system 704 may provide a list of books that correspond with the requested maturity level through a network page 732 for the user 708. The network page 732 may include information about the books, including images, titles of the books, authors, and other information. In some examples, the network page 732 may provide a tool that allows the user to order the book through the network page 732 (e.g., by accessing an electronic marketplace and/or one or more sellers that offer the item for purchase).

The computer system 704 may provide a reference for the electronic book associated with the story in response to the request for the electronic book associated with the maturity level. The reference to the electronic book may be provided as a link to the electronic book, a network page that identifies the electronic book(s), rankings/filters associated with the identification of the electronic book, or other formats of providing the reference.

In some examples, an electronic book may be provided as the reference to the book, instead of a link to the electronic book. For example, the user 708 may request a book directed at a six year native English speaker maturity level. The user may provide the request through an electronic book reader or other user computing device reference in relation to FIG. 2. The computer system 704 may determine the book (e.g., via the data store 710) and provide the text of the electronic book directly to the electronic book reader operated by the user 708.

In some examples, the user 708 may be a third party computer and the reference for the book may be provided as a service by the computer system 704 to the third party computer. For example, the computer system 704 may receive a request for the overall maturity level of the electronic book from a third party computer and the computer system 704 can provide the overall maturity level of the electronic book to the third party computer. The third party computer may provide links to the books (e.g., through the third party's catalog of content) based in part on the information provided by the computer system 704.

In another example, the third party computer may request the maturity level of a particular book as part of a service provided by computer system 704. For example, the computer system 704 can receive a request for the overall maturity level of the electronic book from a third party computer and provide the overall maturity level to the third party computer. The third party computer may provide recommendations of the book, rank/filter the books, or simply provide the maturity level for one or more books as a list to a user (e.g., "these are the books that your first grade son can read").

Illustrative methods and systems for determining a maturity level of a book are described above. Some or all of these systems and methods may, but need not, be implemented at least partially by architectures such as those shown at least in FIGS. 1-7 above.

Figure 8:
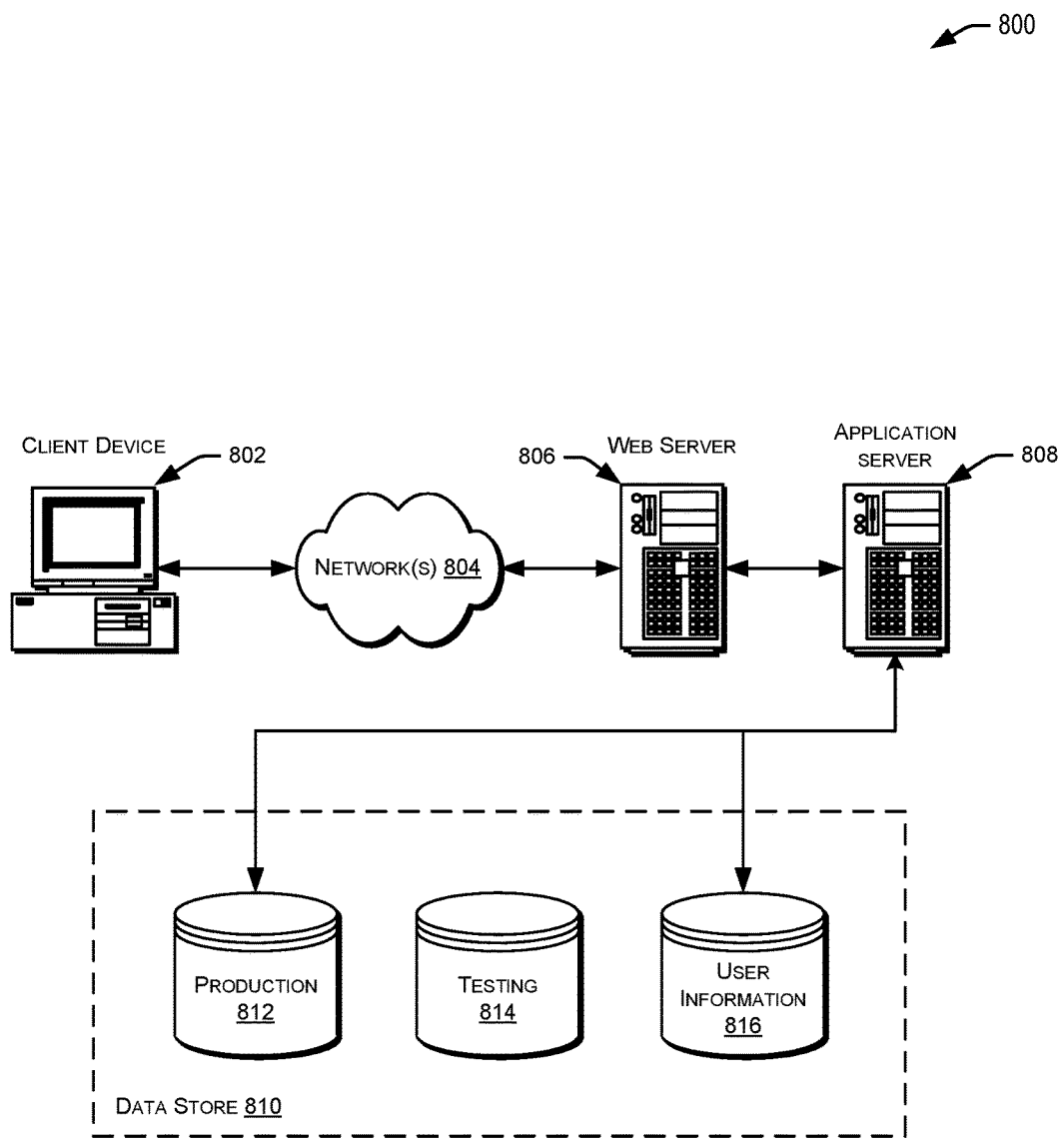
FIG. 8 illustrates an environment in which various embodiments of determining a maturity level of a text string can be implemented, according to at least one example.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 802. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, Visual C#® or C++, or any scripting language, such as Perl®, Python® or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and/or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computing device comprising:
   a memory configured to store computer-executable instructions; and
   a processor in communication with the memory configured to execute the computer-executable instructions to at least:
   determine, by the computing device, at least a portion of a text string associated with a story;
   determine, by the computing device, a linguistic element in the text string;
   analyze, by the computing device, at least one action in the text string by comparing the linguistic element in the text string to a story complexity that comprises an identification of a linear or non-linear story flow; and
   determine, by the computing device, a maturity level associated with the portion of the text string based on the analysis by at least:
   determining a violence rating for a particular character in the portion of the text string; and
   adjusting the maturity level of the portion of the text string to a greater maturity level based in part on the violence rating for the particular character in the portion of the text string.

2. The computing device of claim 1, wherein the analysis further comprises comparing the linguistic element with a data store of mature vocabulary.

3. The computing device of claim 1, wherein the story complexity comprises an identification of a number of characters and wherein determining the maturity level associated with the portion of the text string comprises:
   adjusting the maturity level of the portion of the text string to a greater maturity level based in part on the identification of the number of characters.

4. The computing device of claim 1, wherein the analysis further comprises generating a character graph that represents relationships between one or more characters in the text string based at least in part upon one or more verbs and the at least one action, the one or more characters represented as nodes in the character graph.

5. The computing device of claim 1, wherein the computer-executable instructions further comprise:
   receive a requested maturity level for an electronic book;
   compare the requested maturity level for the electronic book with the maturity level associated with the portion of the text string;
   when the requested maturity level for the electronic book is similar to the maturity level associated with the portion of the text string, identify the electronic book associated with the story; and
   provide a reference for the electronic book associated with the story in response to the requested maturity level for the electronic book.

6. The computing device of claim 1, wherein analyzing the story complexity further comprises:
   determining a character in the story;
   determining a number of other characters that interact with the character; and
   identifying a greater story complexity when the number of other characters associated with the character exceeds a character threshold.

7. The computing device of claim 6, wherein an interaction between the character and at least one of the other character involves a communication.

8. The computing device of claim 7, wherein the character and the at least one of the other character are associated with each other when a second linguistic element associated with the character appears within a threshold distance of a third linguistic element associated with at least one of the other characters in the text string.

9. The computing device of claim 1, wherein the comparison of the linguistic element to the story complexity comprises:
   determining a number of unique linguistic terms in the text string; and
   adjusting the maturity level when the number of unique linguistic terms in the text string exceeds a threshold.

10. One or more non-transitory computer-readable storage media collectively storing computer-executable instructions that, when executed by one or more computer systems, configure the one or more computer systems to collectively perform operations comprising:
    determining at least a portion of a text string associated with a story;
    determining a linguistic element in the text string;
    analyzing the linguistic element in the text string with respect to a story complexity that comprises an identification of a linear or non-linear story flow, wherein analyzing the story complexity further comprises:
    determining a character in the story;
    determining a number of other characters that interact with the character; and
    identifying a greater story complexity when the number of other characters associated with the character exceeds a character threshold; and
    determining a maturity level associated with the portion of the text string based on the analysis.

11. The one or more non-transitory computer-readable storage media of claim 10, wherein determining the maturity level associated with the portion of the text string comprises:
    determining a violence rating for a particular character in the portion of the text string; and
    adjusting the maturity level of the portion of the text string to a greater maturity level based in part on the violence rating for the particular character in the portion of the text string.

12. The one or more non-transitory computer-readable storage media of claim 10, wherein the violence rating is stored with a data store of mature vocabulary.

13. The one or more non-transitory computer-readable storage media of claim 10, wherein the story is associated with a motion picture and the text string is associated with a script or subtitles of the motion picture.

14. The one or more non-transitory computer-readable storage media of claim 10, wherein the story is associated with an electronic book and the text string is associated with a passage or chapter of the electronic book.

15. The one or more non-transitory computer-readable storage media of claim 10, wherein the operations further comprise:
   receiving a requested maturity level for an electronic book;
   comparing the requested maturity level for the electronic book with the maturity level associated with the portion of the text string;
   when the requested maturity level for the electronic book is similar to the maturity level associated with the portion of the text string, identifying the electronic book associated with the story; and
   providing a reference for the electronic book associated with the story in response to the requested maturity level for the electronic book.

16. A computer-implemented method comprising:
   determining, by a computing device, at least a portion of a text string associated with a story;
   determining, by the computing device, a linguistic element in the text string;
   analyzing, by the computing device, at least one action in the text string by comparing the linguistic element in the text string to a story complexity that comprises an identification of a number of characters; and
   determining, by the computing device, a maturity level associated with the portion of the text string based on the analysis, wherein a character and at least one other character are associated with each other when a second linguistic element associated with the character appears within a threshold distance of a third linguistic element associated with at least one of the other characters in the text string.

17. The computer-implemented method of claim 16, wherein analyzing the story complexity further comprises:
   identifying a greater story complexity when the number of characters exceeds a character threshold.

18. The computer-implemented method of claim 16, wherein determining the maturity level associated with the portion of the text string comprises:
   determining a violence rating for a particular character in the portion of the text string; and
   adjusting the maturity level of the portion of the text string to a greater maturity level based in part on the violence rating for the particular character in the portion of the text string.

* * * * *